June 20, 1933.  R. G. FEAR  1,914,664

SHUTTER CONTROL DEVICE FOR MOTION PICTURE MACHINES

Filed Dec. 16, 1929  2 Sheets-Sheet 1

INVENTOR.
RALPH G. FEAR.
BY
ATTORNEY.

June 20, 1933.  R. G. FEAR  1,914,664
SHUTTER CONTROL DEVICE FOR MOTION PICTURE MACHINES
Filed Dec. 16, 1929  2 Sheets-Sheet 2
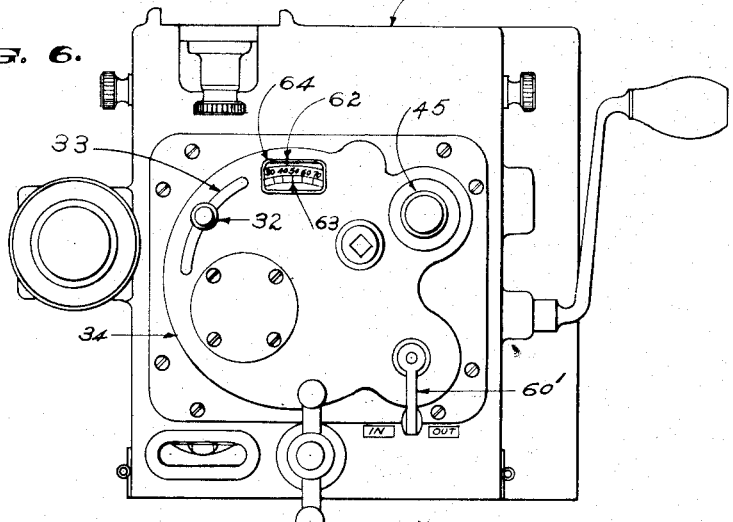
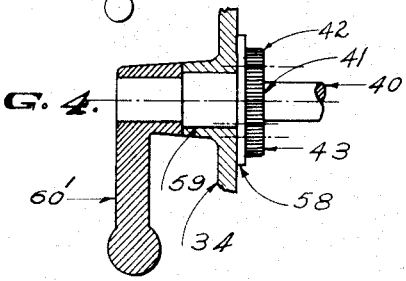
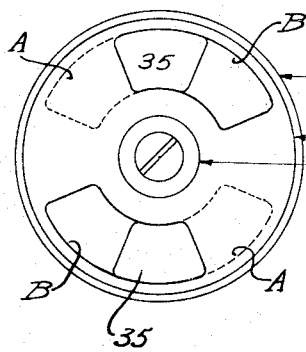 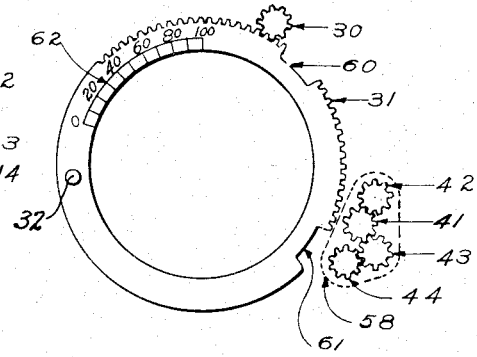
INVENTOR.
RALPH G. FEAR.
BY
ATTORNEY.

Patented June 20, 1933

1,914,664

UNITED STATES PATENT OFFICE

RALPH G. FEAR, OF LOS ANGELES, CALIFORNIA

SHUTTER CONTROL DEVICE FOR MOTION PICTURE MACHINES

Application filed December 16, 1929. Serial No. 414,411.

This invention relates to motion picture apparatus and particularly to shutters which are employed in motion picture machines for controlling the intermittent passage of light rays and consists principally of means for varying the size of the shutter openings so as to reduce or increase the length of time during which light is allowed to pass at each operation of the shutter.

The invention is readily adaptable to the various types of motion picture machines in common use, particularly, however, to motion picture cameras.

In operating motion picture cameras or the like, it has been found highly desirable at times to be able to change the size of the opening in the shutter plate. This effect is distinctive from varying the size of the aperture in the camera in that the time of light exposure is controlled by the opening in the shutter plate while the aperture in the camera controls only the amount of light passed during each exposure. With my invention it becomes possible to open the aperture in the camera to pass the greatest amount of light possible and at the same time cut down the time of exposure to a minimum or vice versa. Accordingly, it becomes an object of my invention to provide means whereby the aperture in the shutter may be varied to increase or decrease the length of time during which the light rays will be allowed to pass therethrough, thus making it possible to vary the length of time of exposure of the film to light, and assure proper exposure on the negative.

Another feature of my invention resides in the utilization of my device for effecting fade-outs and fade-ins by means of progressively decreasing or increasing the size of the shutter opening. This may be done either mechanically by the means that operates the camera or by manual means. It, therefore, becomes another object of this invention to provide a device having the above characteristics.

Certain cases arise where it is desirable to optionally control the size of the shutter opening. My invention accordingly contemplates means whereby the operator may manually control the shutter opening at will and obtain fade-outs and fade-ins of any desired length or may set the shutter opening to a desired fixed size for prolonged operation.

Still another object is to provide means whereby the shutter opening may be mechanically operated to open or close at variable speeds.

I attain these objects by the apparatus illustrated in the accompanying drawings, in which Fig. 1 is an enlarged sectional view in elevation of my device through the plane of the shutter shaft and shutter control mechanism, showing the shutter and its driving and control mechanism for varying the size of the exposure aperture in the shutter;

Fig. 3 is a view of the improved shutter showing the aperture thereof and illustrating how the control blade closes said aperture;

Fig. 4 is a view showing the mechanism used to control the mechanical movement of the shutter control;

Fig. 5 is a view in elevation disclosing the shutter control actuating mechanism with its case removed to more clearly show its construction; and Fig. 6 is a view in elevation illustrating the shutter control with its hand lever indicating dial and mechanical control as viewed from the rear of the camera.

Figure 1:
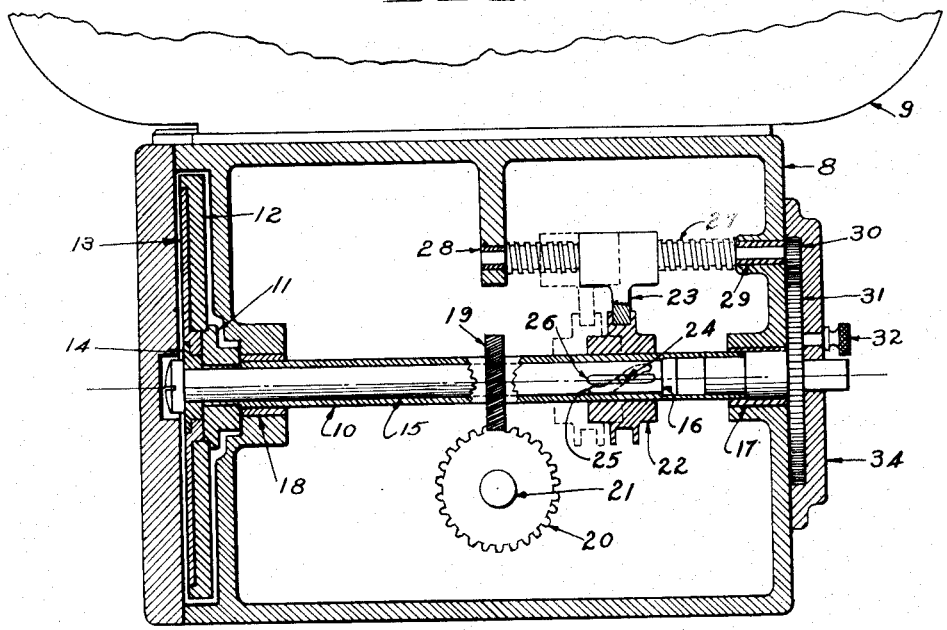

Referring more particularly to the drawings, reference numeral 8 indicates a camera case upon which is mounted a film magazine 9. Mounted within the camera is a hollow shutter shaft 10 to which is affixed a hub 11 upon which is mounted a circular shutter 12 having an aperture A formed therein. A shutter control plate 13 is placed in front of the shutter 12, which has an opening B formed within it substantially as shown in Fig. 3. Said shutter control plate 13 is mounted upon a hub 14 which is adapted to be keyed to the shutter control plate shaft 15, in any suitable manner. The shutter control plate shaft 15 is journaled within the shutter shaft 10 and is adapted to rotate in unison with it. This shaft 15 is held in a fixed position with respect to longitudinal movement by a suitable shoulder 16 within the shaft 10 and by the shutter control leaf hub 14.

Said shutter shaft 10 is journaled in bearings 17 and 18, and is adaptable to be driven by a gear 19 which is securely affixed to said shaft, said gear 19 in turn being driven by a gear 20 mounted on a shaft 21, said shaft 21 being suitably journaled in the camera case and is adaptable to be driven by a crank or other conventional means.

Mounted upon said shutter shaft 10 is a sleeve 22, which is adaptable to slide longitudinally and to receive a yoke 23. Said sleeve 22 has a pin 24 engaging with a helical slot 25, in the hollow shutter shaft 10, and a straight slot 26 in the shutter control plate shaft 15.

The relative rotation of the plate 13 to the shutter 12 is accomplished by the mechanism shown. The shaft 15, as before stated, is provided with a longitudinal slot 26 and the shutter driving shaft 10 is provided with oppositely disposed helical slots 25 which are generated to advance through an angle of approximately 90°. Aforesaid pin 24 has its ends retained in said sleeve 22 and passes diametrically through the helical slots 25 in the shutter shaft 10 and the longitudinal slot 26 in the shaft 15. By moving the sleeve longitudinally upon the shaft 10, the pin 24 may be caused to advance in either direction in the slots 25 and 26. The slot 25 being disposed helically with relation to the longitudinal slot 26 will cause said shaft 10 to rotate with respect to the sleeve 22 and the shaft 15 through an angle depending upon the advance of the helical slot 25.

The advance of the helical slot 25 shown is through an angular space of substantially 90°, sufficient to cause the closing of the openings 35 by the control plate 13 as shown in Fig. 3. Fig. 1 shows the pin 24 positioned at an intermediate point in the helical slot 25 corresponding to an angle of 45° and the corresponding shutter position as shown in Fig. 3.

The yoke 23 is threaded and journaled upon a threaded shaft 27 which is journaled in the camera case by the bearings 28 and 29. Said shaft 27 has a pinion gear 30 affixed to its outer end. The pinion gear 30 engages with a gear 31, journaled in the case 8, and is adaptable to be rotated by said gear. A handle 32 arranged for manual rotation of gear 31 is affixed to the gear 31 and projects through a slot 33 in the cover plate 34. This slot is shown in Fig. 6.

As shown in Fig. 3, the shutter 12 and the control plate 13 have segmental openings A and B, respectively, which may extend through an angle of approximately 90° but which by relative movement may be made larger or smaller as desired.

By rotating the control plate 13 with respect to the shutter 12, it is possible to decrease the opening through which the light may pass from a maximum, or approximately 90° breadth, to complete closure, thus making it possible to fade-in or out, or to set the exposure aperture for any desired opening. In Fig. 3, this opening is designated 35.

Figure 2:
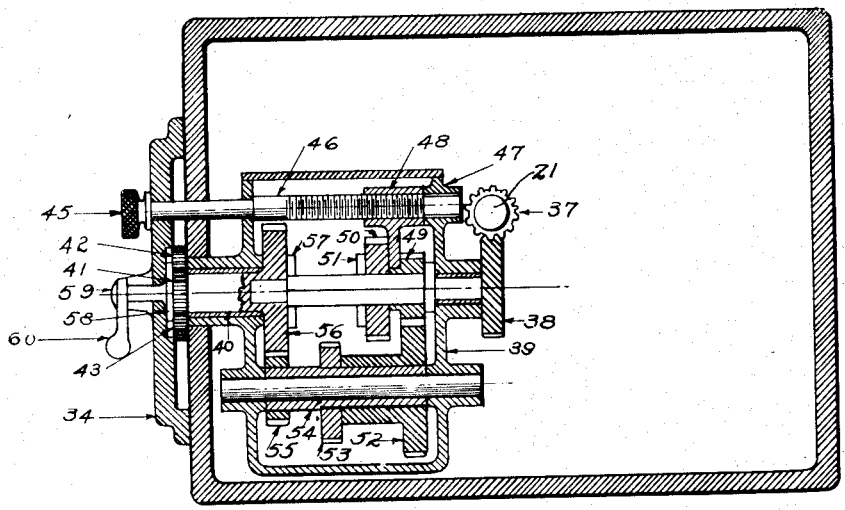
Fig. 2 is a vertical sectional view of the camera in an inverted position and turned through 180° with respect to Fig. 1 and illustrates the driving mechanism used for mechanically driving the shutter control mechanism.

From the foregoing explanation, it will be perceived that the sleeve 22 may be moved upon the shutter shaft 10 by the yoke 23 which has an internal thread formed therein engaging with the threaded shaft 27, and may be moved in a longitudinal direction if the shaft 27 is rotated. Thus by moving the handle 32 which imparts a rotative movement to the gear 31, causing pinion 30 to rotate, the screw 27 forces the yoke 23 to move longitudinally which imparts a rotative movement of the shaft 15 which respect to the shaft 10, and effectively controls the shutter opening. This arrangement provides a manual means of operation, but it is obvious that a mechanical means operable by the camera actuating means may also be employed. In this respect, referring to Fig. 2, the shutter control is shown as being driven mechanically by the ordinary camera mechanism. In this arrangement a gear 37, which is rigidly affixed to the shaft 21, engages with a mating gear 38 and imparts a rotative movement thereto. This gear 38 imparts motion to a three-speed transmission 39 which, through its mechanism, drives a shaft 40 having a pinion gear 41 affixed to its outer end and adapted to engage the idler pinions 42 and 43, indicated in Fig. 5, causing them to rotate.

The transmission is controlled by a knob 45 affixed to a rotatable threaded shaft 46, journaled in the case 47 of the transmission 39. Said shaft 46 carries a yoke 48 which is internally threaded so as to engage the threads on the shaft 46. Said yoke 48 engages with slidable dual gears 49 and 50, a dog clutch 51 being formed as an integral part thereon. The sliding gears 49 and 50 are adapted to engage with gears 52 and 53 of the jack shaft 54 and impart a rotative movement thereto, thus causing gear 55 to impart a rotative movement to gear 56, which has a dog clutch 57 formed thereon as an integral part. Said gear 56 being affixed to the shaft 40, it is apparent that it imparts a rotative motion to the pinion gear 41.

Referring now more particularly to the operation of the transmission mechanism; upon rotating the operating knob 45, the aforesaid yoke 48 is carried longitudinally into a correct position for engagement of one of the described sets of gears forming the transmission element, and thereby the shutter mechanism is operatively connected for opening or closing the same, or, said shutter control mechanism may be directly driven by engagement of the dog clutches 51 and 57 of the gears 50 and 66. For ordinary purposes, I arrange said transmission gears to have a ratio of 1—2 and 4 with respect to their driving shaft.

The pinions 42 and 43, Fig. 5, engage with the pinion 41 and are mounted on a plate 58 which also carries the pinion 44 which engages with pinion 43. This plate is affixed to a shaft 59 which has its center in alignment with the center of aforesaid pinion 41. It will be noted that pinion 43 is an idler pinion and that it causes pinion 44 to rotate in a reverse direction to that of pinion 42. The shaft 59 is journaled in the cover plate 34 and has a control lever 60' securely affixed thereto. Operation of the control lever 60' causes the shaft 59 to rotate and impart a rotative motion to the plate 58 which in turn causes either the pinion 42 or 44 to engage with the gear 31 and impart rotative motion thereto. The pinion 30 thus rotates and moves aforesaid shutter control plate as heretofore described.

Referring now to Fig. 5, it will be observed that the gear 31 is mutilated at 60 and 61 and, that at a position corresponding to a full shutter opening, said gear 31 will rotate only when aforesaid pinion 42 is engaged with it, thus preventing damage to the mechanism by any over travel of the control mechanism, and conversely, when the shutter is closed by rotation of aforesaid pinion 42, the gear 31 will rotate until said pinion 42 drops into the mutilated segment 60, engagement therewith causing it to stop rotating. The mutilated segments are constructed so that the mechanical drive ceases to function when the shutter aperture has been entirely closed or opened as the case may be.

A dial 62, Fig. 6, is engraved upon the gear 31, and an indicator 63 indicates the opening of the shutter aperture, a suitable transparent window 64 excluding foreign matter from contact with the mechanism.

As an article of manufacture, my device is readily produced from materials obtainable in the open market. Its substantial construction, simple methods of operation, and ease of control readily adapt it to present day requirements; and from the full and clear description herein, any one engaged in the art to which it applies can readily make and use the same.

I am aware that slight modifications may from time to time be made in the details of construction illustrated without departing, however, from the scope of the present invention as herein set forth, and as defined in the claims which are appended hereto. Hence, I do not limit my present invention to the exact description or construction herein disclosed.

I claim as my invention:

1. In a device of the class described: a shutter shaft; a shutter mounted on said shaft adaptable to operative control; means for mechanically controlling the operation of the same, said means comprising a shutter control plate axially disposed on a rotatable shaft and in close relation with said shutter, said plate and said shutter being provided with segmental openings capable of overlapping each other, a sleeve member slidably mounted on said shutter shaft and engaging with a yoke having an internally threaded portion mounted on a threaded shaft, and means comprising a pinion gear mounted on said threaded shaft, and a driving gear engaging said pinion gear for rotating said threaded shaft, said driving gear having mutilated segments arranged to stop rotation at fixed points; and gear shift means operable to drive said gear in either direction.

2. In a device of the class described: a shutter shaft; a shutter mounted on said shaft adaptable to operative control; means for mechanically controlling the operation of the same, said means comprising a shutter control plate axially disposed on a rotatable shaft and in close relation with said shutter, said plate and said shutter being provided with segmental openings capable of overlapping each other, a sleeve member slidably mounted on said shutter shaft and engaging with a yoke having an internally threaded portion mounted on a threaded shaft, and means for rotating said threaded shaft comprising a pinion gear mounted upon said threaded shaft; an actuating driving gear meshing with said pinion gear and gear means operable to drive said driving gear in either direction, said gear means including a driving pinion gear mounted upon a driven shaft; a rotatable plate pivotally mounted in axial alignment with said shaft; driven pinion gears mounted on said plate and meshing with said driving pinion gear, a pair of said driven gears rotating in opposite directions; and means for rotating said plate to alternately bring said driven pinion gears into mesh with said actuating driving gear to impart opposite rotation thereto.

3. In a device of the class described: a shutter shaft; a shutter mounted on said shaft adaptable to operative control; means for mechanically controlling the operation of the same, said means comprising a shutter control plate axially disposed on a rotatable shaft and in close relation with said shutter, said plate and said shutter being provided with segmental openings capable of overlapping each other, a sleeve member slidably mounted on said shutter shaft and engaging with a yoke having an internally threaded portion mounted on a threaded shaft, and means for rotating said threaded shaft comprising a pinion gear mounted upon said threaded shaft; an actuating driving gear meshing with said pinion gear and operable to drive said gear in either direction; means for rotating said actuating gear, said means including a driving pinion gear mounted upon a driven shaft; a rotatable plate pivotally mounted in axial alignment with said shaft; driven pinion gears meshing with said driving pinion gear mounted upon said plate; a pair of said driven pinion gears rotating in opposite directions; means for rotating said plate to alternately bring said driven pinion gears into mesh with said actuating gear and thereby cause corresponding rotation of said pinion gear mounted on said threaded shaft; and variable speed means for driving said driven shaft.

4. In a device of the class described: a shutter shaft; a shutter mounted in said shaft adaptable to operative control; means for mechanically controlling the operation of the same, said means comprising a shutter control plate axially disposed on a rotatable shaft and in close relation with said shutter, said plate and said shutter being provided with segmental openings capable of overlapping each other, a sleeve member slidably mounted on said shutter shaft and engaging with a yoke having an internally threaded portion mounted on a threaded shaft, and means for rotating said threaded shaft comprising a pinion gear mounted upon said threaded shaft; an actuating driving gear meshing with said pinion gear and gear means operable to drive said pinion gear in either direction, said gear means including a driving pinion gear mounted upon a driven shaft; a rotatable plate pivotally mounted in axial alignment with said shaft; driven pinion gears mounted on said plate and meshing with said driving pinion gear; a pair of said driven pinion gears rotating in opposite directions; means for rotating said plate to alternately bring said driven pinion gears into mesh with said actuating driving gear to impart opposite rotation thereto; and variable speed means for driving said driven shaft, said variable speed means having an external control means.

5. In a device of the class described: a shutter and a shutter control plate axially disposed in close relation with each other and each having segmental openings capable of overlapping each other; a shutter operating shaft and a shutter control plate operating shaft telescopically arranged and connected with the shutter and the shutter control plate respectively; means for rotating said shafts in synchronism; and means for adjustably rotating said shafts relative to each other comprising a sleeve slidably mounted on the outer shaft, pin means in said sleeve extending into angularly disposed slots in said shafts, a threaded shaft, a yoke engaging said sleeve and having an internally threaded portion engaging said threaded shaft, a pinion gear on said threaded shaft, a driving gear engaging said pinion gear, and gear shift means operable to drive said driving gear in either direction, said driving gear having mutilated segments arranged to stop rotation at fixed points.

6. In a device of the class described: a shutter and a shutter control plate axially disposed in close relation with each other and each having segmental openings capable of overlapping each other; a shutter operating shaft and a shutter control plate operating shaft telescopically arranged and connected with the shutter and the shutter control plate respectively; means for rotating said shafts in synchronism; and means for adjustably rotating said shafts relative to each other comprising a sleeve slidably mounted on the outer shaft, pin means in said sleeve extending into angularly disposed slots in said shafts, a threaded shaft, a yoke engaging said sleeve and having an internally threaded portion engaging said threaded shaft; a pinion gear mounted upon said threaded shaft; an actuating driving gear meshing with said pinion gear and gear means operable to drive said driving gear in either direction, said gear means including a driving pinion gear mounted upon a driven shaft; a rotatable plate pivotally mounted in axial alignment with said shaft; driven pinion gears mounted on said plate and meshing with said driving pinion gear, a pair of said driven gears rotating in opposite directions; and means for rotating said plate to alternately bring said driven pinion gears into mesh with said actuating driving gear to impart opposite rotation thereto.

7. In a device of the class described: a shutter and a shutter control plate axially disposed in close relation with each other and each having segmental openings capable of overlapping each other; a shutter operating shaft and a shutter control plate operating shaft telescopically arranged and connected with the shutter and the shutter control plate respectively; means for rotating said shafts in synchronism; and means for adjustably rotating said shafts relative to each other comprising a sleeve slidably mounted on the outer shaft, pin means in said sleeve extending into angularly disposed slots in said shafts, a threaded shaft, a yoke engaging said sleeve and having an internally threaded portion engaging said threaded shaft; a driven pinion gear mounted upon said threaded shaft; an actuating driving gear meshing with said pinion gear and operable to drive said driven pinion gear in either direction; a driven shaft; a driving pinion gear on said driven shaft; a gear supporting plate pivotally mounted on the axis of said driven shaft; driven pinion gears mounted upon said plate and meshing with said driving pinion gear; a pair of said driven pinion gears rotating in opposite directions; means for rotating said plate to alternately bring said oppositely rotating driven pinion gears into mesh with said actuating gear and thereby cause corresponding rotation with said pinion gear on said threaded shaft; and variable speed means for driving said driven shaft.

8. In a device of the class described: a shutter and a shutter control plate axially disposed in close relation to each other and each having segmental openings capable of overlapping each other; a shutter operating shaft and a shutter control plate operating shaft telescopically arranged and connected with the shutter and the shutter control plate respectively; means for rotating said shafts in synchronism; and means for adjustably rotating said shafts relative to each other comprising a sleeve slidably mounted on the outer shaft, pin means in said sleeve extending into angularly disposed slots in said shafts, a threaded shaft, a yoke engaging said sleeve and having an internally threaded portion engaging said threaded shaft; a pinion gear mounted upon said threaded shaft; an actuating driving gear meshing with said pinion gear and gear means operable to drive said pinion gear in either direction, said gear means including a driving pinion gear mounted upon a driven shaft; a rotatable plate pivotally mounted in axial alignment with said driven shaft; driven pinion gears mounted on said plate and meshing with said driving pinion gear, a pair of said driven pinion gears rotating in opposite directions; means for rotating said plate to alternately bring said driven pinion gears into mesh with said actuating driving gear to impart opposite rotation thereto; variable speed means for driving said driven shaft; and an external control means for said variable speed means.

In testimony whereof, I have hereunto set my hand at Los Angeles, California, this 13th day of November 1929.

RALPH G. FEAR.